(12) United States Patent
Noguchi et al.

(10) Patent No.: US 7,792,677 B2
(45) Date of Patent: Sep. 7, 2010

(54) VOICE GUIDE SYSTEM AND VOICE GUIDE METHOD THEREOF

(75) Inventors: Nozomi Noguchi, Kanagawa (JP); Michihiro Kawamura, Kanagawa (JP); Kanji Itaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1050 days.

(21) Appl. No.: 11/220,573

(22) Filed: Sep. 8, 2005

(65) Prior Publication Data

US 2006/0217985 A1 Sep. 28, 2006

(30) Foreign Application Priority Data

Mar. 23, 2005 (JP) ............................. 2005-084171

(51) Int. Cl.
*G10L 21/06* (2006.01)

(52) U.S. Cl. ..................................... 704/273

(58) Field of Classification Search .................. 704/273
See application file for complete search history.

(56) References Cited

U.S. PATENT DOCUMENTS

| | | | | |
|---|---|---|---|---|
| 5,737,393 A | * | 4/1998 | Wolf | 379/88.13 |
| 5,797,125 A | * | 8/1998 | Hirohama | 704/277 |
| 5,915,001 A | * | 6/1999 | Uppaluru | 379/88.22 |
| 6,400,806 B1 | * | 6/2002 | Uppaluru | 379/88.02 |
| 6,885,736 B2 | * | 4/2005 | Uppaluru | 379/88.17 |
| 6,983,273 B2 | * | 1/2006 | Banerjee et al. | 707/3 |
| 7,039,165 B1 | * | 5/2006 | Saylor et al. | 379/88.18 |
| 7,072,984 B1 | * | 7/2006 | Polonsky et al. | 709/246 |
| 7,127,403 B1 | * | 10/2006 | Saylor et al. | 704/275 |
| 7,203,721 B1 | * | 4/2007 | Ben-Efraim et al. | 709/203 |
| 7,219,123 B1 | * | 5/2007 | Fiechter et al. | 709/203 |
| 7,318,198 B2 | * | 1/2008 | Sakayori et al. | 715/729 |

FOREIGN PATENT DOCUMENTS

| | | |
|---|---|---|
| JP | A-63-038996 | 2/1988 |
| JP | A-63-231496 | 9/1988 |
| JP | A-07-296083 | 11/1995 |
| JP | A 2003-140880 | 5/2003 |
| JP | A-2003-335036 | 11/2003 |

\* cited by examiner

*Primary Examiner*—Susan McFadden
(74) *Attorney, Agent, or Firm*—Oliff & Berridge, PLC

(57) ABSTRACT

A voice guide system for outputting voice in response to operations of an information processing apparatus, which includes a password input detecting unit that detects an input operation of a password; and a voice guide outputting unit that outputs by voice an input status of the password in correspondence with the detection of the input operation of the password by the password input detecting unit.

28 Claims, 12 Drawing Sheets

| NO. | KEY ENTRY | DESCRIPTION OF FUNCTION |
|---|---|---|
| 1 | F1 | Help |
| 2 | F2 | Read Out Current Control Value |
| 3 | F3 | Read Out Current Control Label (Name) |
| 4 | F4 | Read Out Help (Keyboard Operating Method) in Current Control |
| 5 | F5 | Read Out Information on Current Control Value (Option) |
| 6 | F6 | Read Out Set Values of All Tabs |
| 7 | Shift+F6 | Read Out Set Value of Dialog on Current Tab |
| 8 | F7 | Read Out All Shortcuts on Current Tab |
| 9 | F8 | Read Out All Information on Expendables |
| 10 | F9 | Return All to Default |
| 11 | F10 | Start |
| 12 | F11 | Read Out Status of Message Area |
| 13 | F12 | Stop Reading Out |
| 14 | Shift+F12 | Temporarily Stop Reading Out |
| 15 | Tab | Move to Next Control |
| 16 | Shift+Tab | Move to Previous Control |
| 17 | Esc | Undo Current Control Value |
| 18 | Alt+1 | Focus on First Tab |
| 19 | Alt+2 | Focus on Second Tab |
| 20 | Alt+3 | Focus on Third Tab |
| 21 | Ctrl✱S | Start Reading Out |
| 22 | Space | Activate Button When Current Control Is Button<br>Check When Current Control is Check Box |
| 23 | Alt+✱(Alphabet) | Select Control on Current Tab |
| 24 | Ctrl+Shift+Space | Read Out All Current Windows |
| 25 | Ctrl+Shift+Enter | Read Out Details of Item |
| 26 | Ctrl+Shift+Insert | Read Out Contents of Edit Combo Box |

FIG.5

VOICE GUIDE SYSTEM AND VOICE GUIDE METHOD THEREOF

This nonprovisional application claims the benefit of Japanese Patent Application No. 2005-084171, filed Mar. 23, 2005. The entire disclosure of the prior applications is hereby incorporated by reference herein in its entirety.

BACKGROUND OF THE INVENTION

1. Field of the Invention

The present invention relates to a voice guide system for outputting voice in response to the operation of an information processing apparatus as well as a voice guide method thereof, and more particularly to a voice guide system adapted to voice guide the input status of a password as well as a voice guide method thereof

2. Description of the Related Art

In information processing apparatuses such as facsimile machines, copying machines and combination machines, and personal computers, various apparatuses have hitherto been proposed which takes into consideration universal design (the design of products, services, and environments which are easy to use for as many people as possible irrespective of differences in age, sex, race, and physical capabilities).

In recent years, in conjunction with the enactment of Section 508 of the Rehabilitation Act of the United States of America, hardware manufacturers providing such information processing apparatuses to customers are tending to proceed with research and development under the awareness that apparatuses which are more accessible and easy to use for a greater number of people enhance the competitiveness of their own companies.

Against such a background, as a technique which takes into consideration visually impaired persons (persons with weak eyesight, persons with low vision, totally blind persons, etc.), an apparatus is known in which voice guide is provided to allow even a visually impaired person to easily perform various operations.

For example, in the information processing apparatus, "paper empty," "lack of toner," "paper jam," and the like are voice guided, and background music (BGM) is played after the voice guide. As this BGM is continuously played, even if the user was away from the apparatus at the point of time of the voice guide, the user is able to recognize in what condition the apparatus is when he or she returns.

However, with the conventional information processing apparatuses, a voice guide corresponding to the contents of a screen display is basically given. For this reason, when entering a password, a screen such as the one shown in FIG. 12 is displayed, and since the password is displayed with asterisks (*) in the light of the confidentiality required by the password, when the voice guide is given, "asterisk" is read out each time one character is entered.

Therefore, the above-described voice guide corresponding to the contents of the screen display has been difficult to use for a user who has difficulty in visually confirming the contents of the display, such as a visually impaired person, since it is impossible to even grasp how the password is being entered.

Accordingly, the present invention has been devised in view of the above-described problems and provides a voice guide system which makes it possible for even a user such as a visually impaired person to easily perform the operation of entering a password, as well as a voice guide method thereof.

SUMMARY OF THE INVENTION

An aspect of the present invention provides a voice guide system for outputting voice in response to operations of an information processing apparatus, including: a password input detecting unit that detects an input operation of a password; and a voice guide outputting unit that outputs by voice an input status of the password in correspondence with the detection of the input operation of the password by the password input detecting unit.

BRIEF DESCRIPTION OF THE DRAWINGS

Embodiments of the present invention will be described in detail based on the following figures, wherein:

FIG. 5 is a diagram illustrating a list of an example of a keyboard specification in the terminal 40 for exclusive use by visually impaired persons;

DETAILED DESCRIPTION OF THE INVENTION

Referring now to the accompanying drawings, a detailed description will be given of the embodiments of a voice guide system and a voice guide system thereof in accordance with the present invention.

FIRST EMBODIMENT

Figure 1:
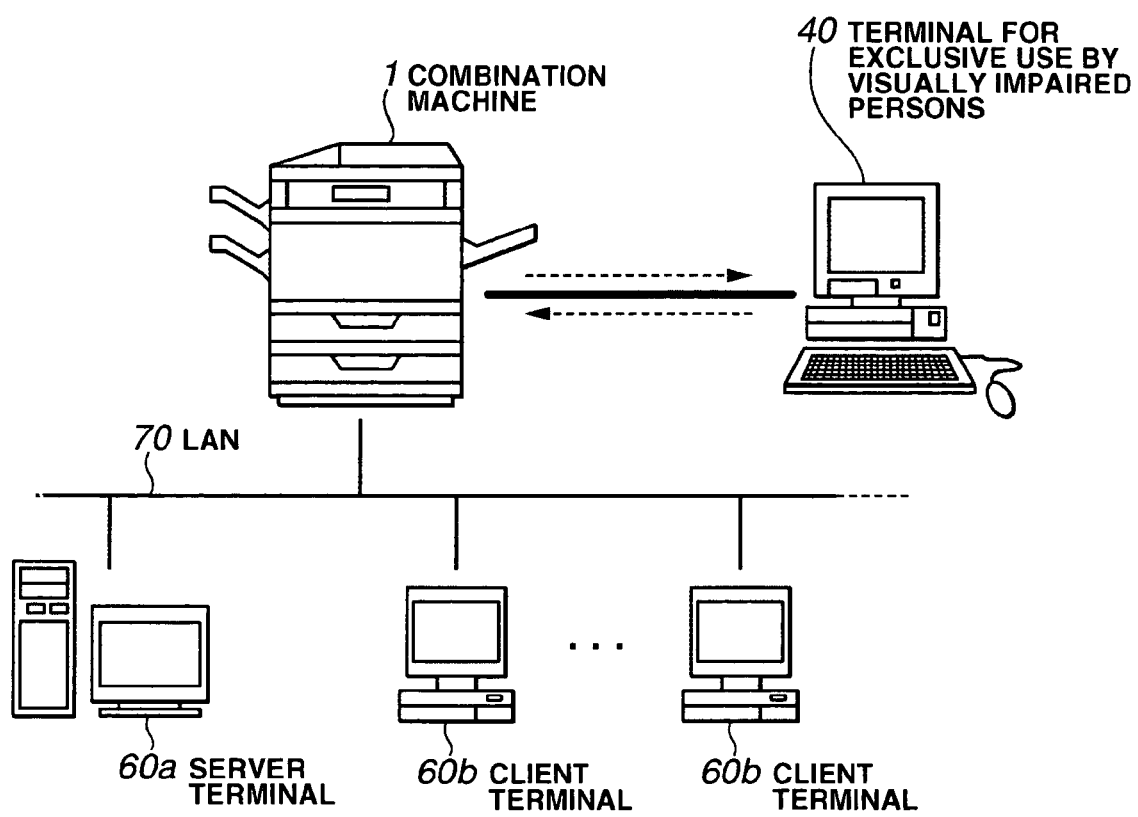
FIG. 1 is a diagram illustrating an example of the overall configuration of a voice guide system in accordance with a first embodiment of the present invention.

FIG. 1 is a diagram illustrating an example of the overall configuration of a voice guide system in accordance with a first embodiment of the present invention. It should be noted that in this embodiment a case is shown in which the present invention is applied to a voice guide system in which a combination machine 1 and a terminal 40 for exclusive use by visually impaired persons are disposed.

This voice guide system is configured by comprising the combination machine 1 and external terminals 60 including a server terminal 60a and client terminals 60b. It should be noted that in this embodiment a description will be given of a case in which the combination machine 1 and the terminal 40 for exclusive use by visually impaired persons are connected through a universal serial bus (USB), and the combination machine 1 and the external terminals 60 are connected by a local area network (LAN) 70, but the form of connection does not particularly matter, and it suffices if communication can be effected between the devices.

The combination machine 1 has copy, facsimile, and scanner functions, and executes a job started from an operation panel provided on itself, the client terminal 60b, or the terminal 40 for exclusive use by visually impaired persons.

The terminal 40 for exclusive use by visually impaired persons is a personal computer handled by a visually impaired person or the like, and the visually impaired person is able to execute various jobs by the combination machine 1 by operating an application which operates on this terminal.

In addition, a speaker is provided, and a voice guide for assisting the visually impaired person's operation is outputted, as required. The voice guide which is outputted from here does not necessarily correspond to the contents of a screen display. In a case where a password is entered at the time of user authentication or the like, asterisks are displayed on the screen as the password. In the voice guide, however, voice guide messages are outputted that "one letter has been entered" in the case where one character has been entered, and that "two characters have been entered" in the case where two characters have been entered.

As described above, the server terminal 60a and the client terminals 60b as the external terminals 60 are connected to the combination machine 1 through the LAN 70. The server terminal 60a is a file server or the like which manages document files and the like, and the client terminals 60b are personal computers handled by users (able-bodied persons). For instance, a user who handles the client terminal 60b is able to select a desired document file in the server terminal 60a and instruct the execution of a job with respect to the selected file to the combination machine 1.

Here, referring to FIGS. 2 and 3, a description will be given of the system configurations of the combination machine 1 and the terminal 40 for exclusive use by visually impaired persons shown in FIG. 1 mentioned above.

Figure 2:
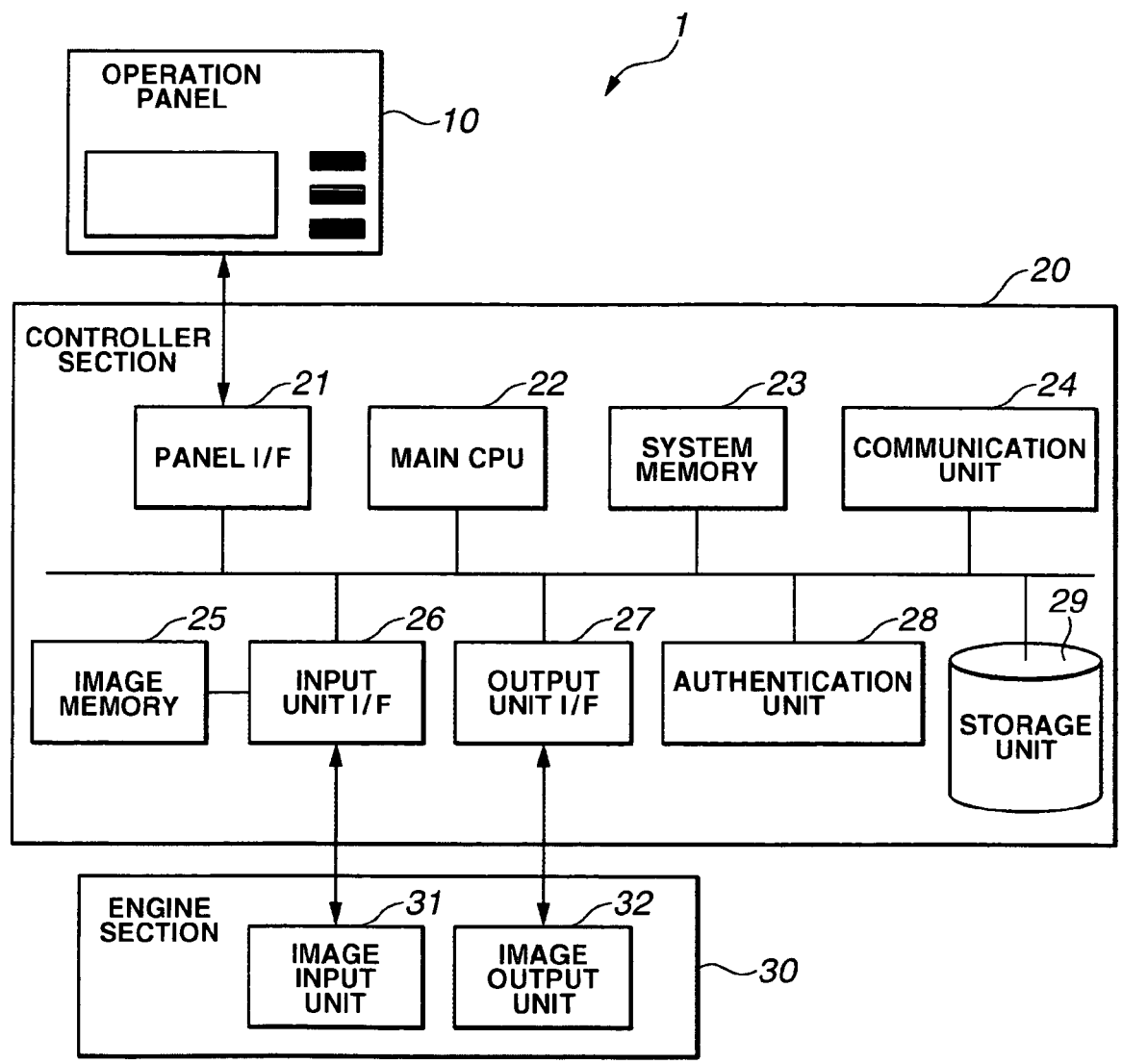
FIG. 2 is a block diagram illustrating the system configuration of a combination machine 1 in accordance with the first embodiment of the present invention.

FIG. 2 is a block diagram illustrating the system configuration of the combination machine 1.

The combination machine 1, if largely classified, is configured by including an operation panel 10 which is an interface between the combination machine 1 and the user; a controller section 20 which effects supervisory control of the combination machine 1; and an engine section 30 which effects input/output processing of images on the basis of an instruction from the controller section 20.

The operation panel 10 is a user interface having an input device such as a touch panel and hard buttons, as well as a display device such as an LED (light emitting diode) and an LCD (liquid crystal display).

The controller section 20 is configured by including a panel I/F (interface) 21 for effecting the transmission or reception of data to or from the aforementioned operation panel 10; a main CPU (central processing unit) 22 for effecting the control and management of operation of the respective units in accordance with a program developed in such as a system memory 23 described below; the system memory 23 which is a work area when program execution and the like are performed; a communication unit 24 which is an interface unit for effecting communication with other devices through such as a telephone line, a network, or a USB; an image memory 25 for temporarily storing images; an input unit I/F (interface) 26 for effecting the transmission or reception of data such as input images to or from an image input unit 31 which will be described later; an output unit I/F (interface) 27 for effecting the transmission or reception of data such as output images to or from an image output unit 32 which will be described later; an authentication unit 28 which is a user authentication mechanism such as a card reader; and a storage unit 29 for holding and managing various operation screens and operation information data.

The engine section 30 is configured by including the image input unit 31 such as a scanner for reading image data formed on paper or the like, as well as the image output unit 32 such as a printer for forming image data on paper or the like. Described above is the system configuration of the combination machine 1 in accordance with the present invention. It should be noted that the combination machine 1 is further provided with a voice output unit for outputting voice data and a power control unit for controlling electric power supply to the respective component elements of the combination machine 1, as required, although not shown.

Figure 3:
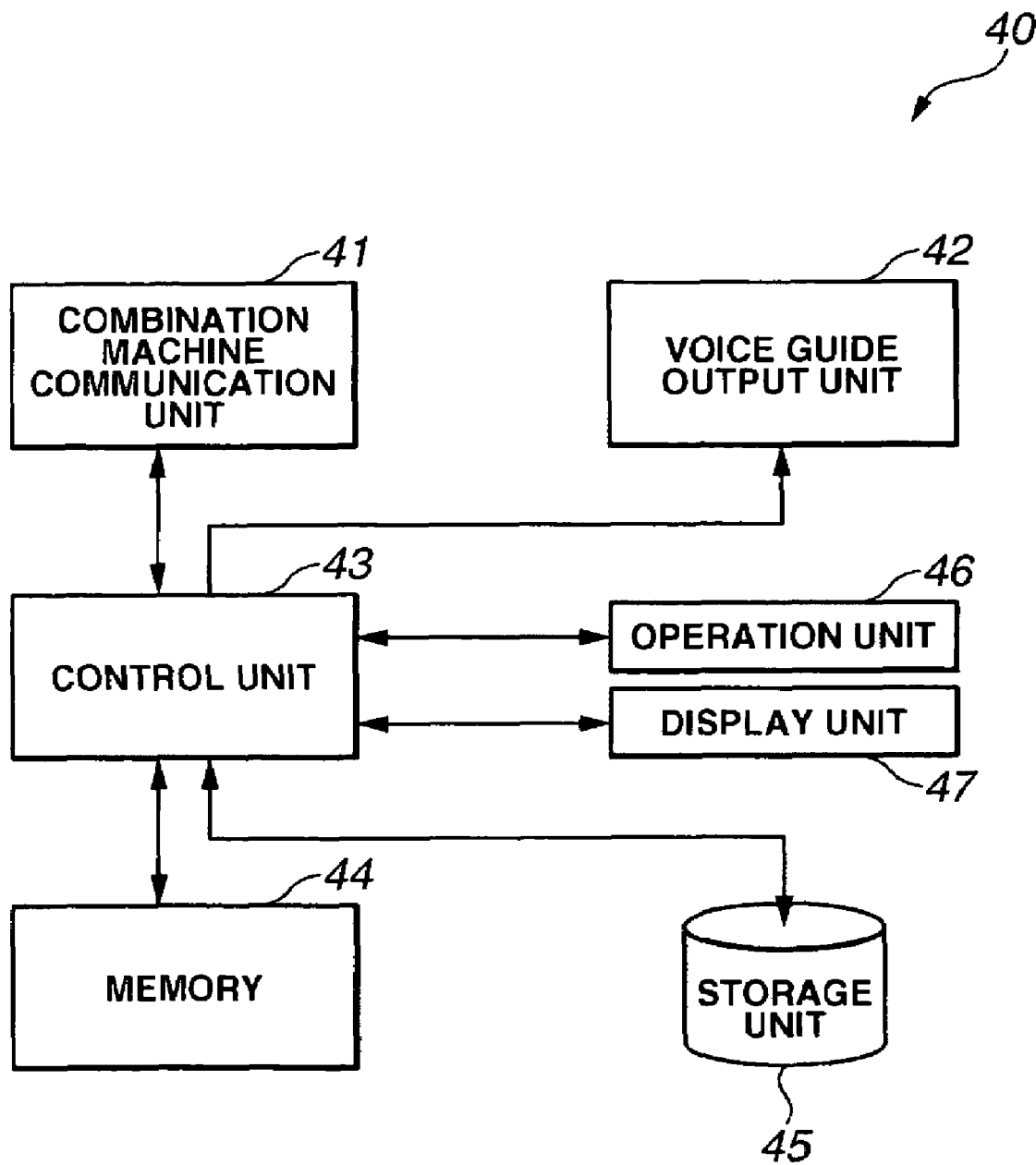
FIG. 3 is a block diagram illustrating the system configuration of the terminal 40 for exclusive use by visually impaired persons in accordance with the first embodiment of the present invention.

Next, FIG. 3 is a block diagram illustrating the system configuration of the terminal 40 for exclusive use by visually impaired persons.

As described above, the terminal 40 for exclusive use by visually impaired persons is a personal computer handled by a visually impaired person or the like, and is connected to the combination machine 1 through a USB cable in such a manner as to be mutually communicatable.

The terminal 40 for exclusive use by visually impaired persons is configured by including a combination machine communication unit 41 for transmitting or receiving various control signals and data to or from the combination machine 1; a voice guide output unit 42 which is a speaker for outputting voice data; a control unit 43 for effecting supervisory control of the terminal 40 for exclusive use by visually impaired persons; a memory 44 which is a work memory at the time of effecting such as the execution of an application; a storage unit 45 which is a storage unit such as a HD (hard disk) for storing various data including the application and the like; an operation unit 46 such as a keyboard or a mouse for entering a password and various data concerning job execution; and a display unit which is a display for displaying the operation screen and the like.

Figure 4:
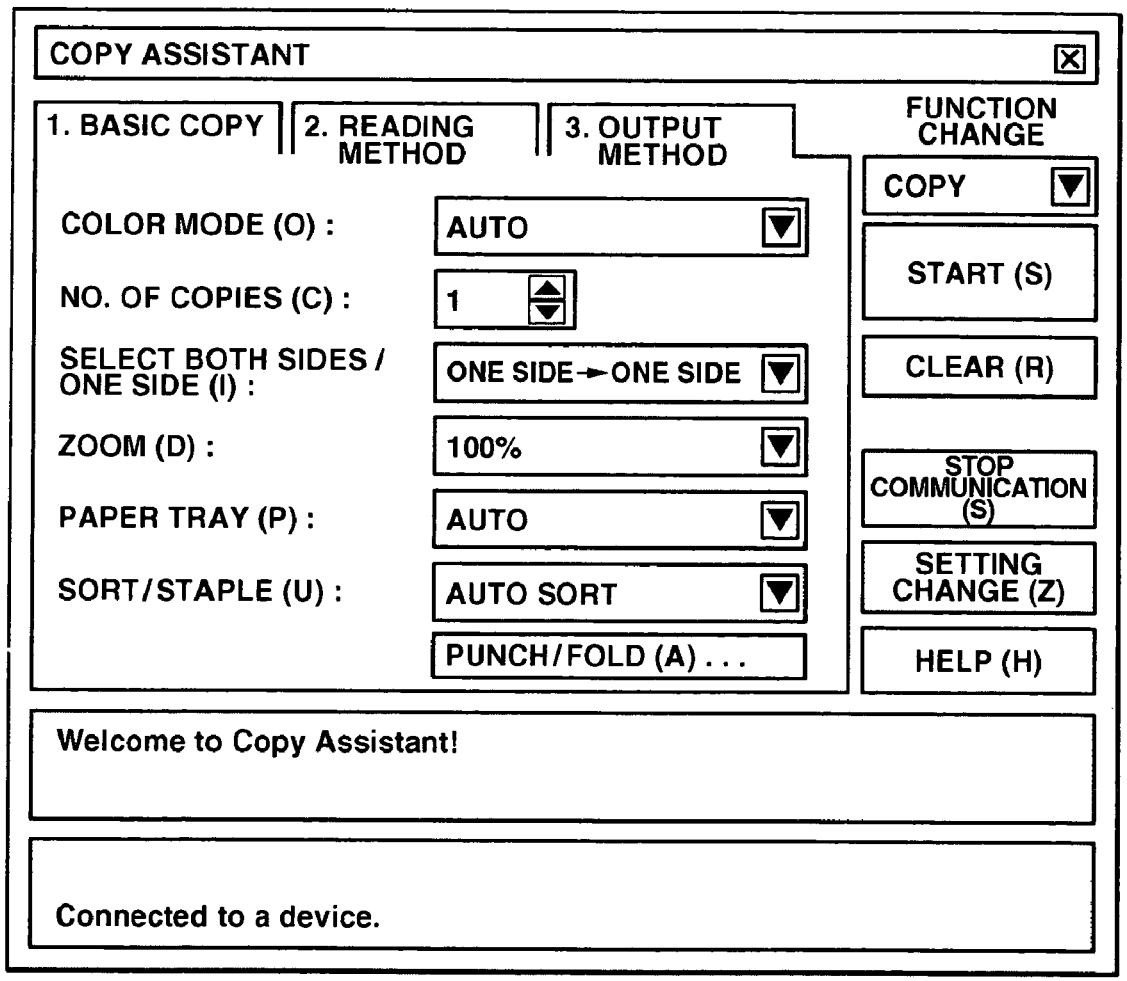
FIG. 4 is a diagram illustrating an example of an application (copy assistant) screen displayed on the terminal 40 for exclusive use by visually impaired persons.

An application (copy assistant) screen, such as the one shown in FIG. 4, is displayed on the display, i.e., the display unit 47. On this screen, it is possible to input various set values concerning the execution of a job, such as a copy job, a facsimile job, and a scanner job, which is desired to be executed by the combination machine 1. In addition, consideration to visually impaired persons is given, and if a pointer is moved to the position of SELECT BOTH SIDE/ONE SIDE by selecting the mouse, a voice guide message is outputted that "You can make a setting change between both sides and one side. You can select one of from one side to one side, from one side to both sides, from both sides to one side, and from both sides to both sides." The visually impaired person executes a job after entering various data concerning the job execution from this screen in accordance with the voice guide.

The keyboard, i.e., the operation unit 46 takes into consideration the operation by visually impaired persons, and the key operation is realized by a keyboard specification such as the one shown in FIG. 5. For example, if 'F2' on the keyboard is pressed, a current set value is voice guided. Described above is the system configuration of the terminal 40 for exclusive use by visually impaired persons in accordance with the present invention.

Figure 6:
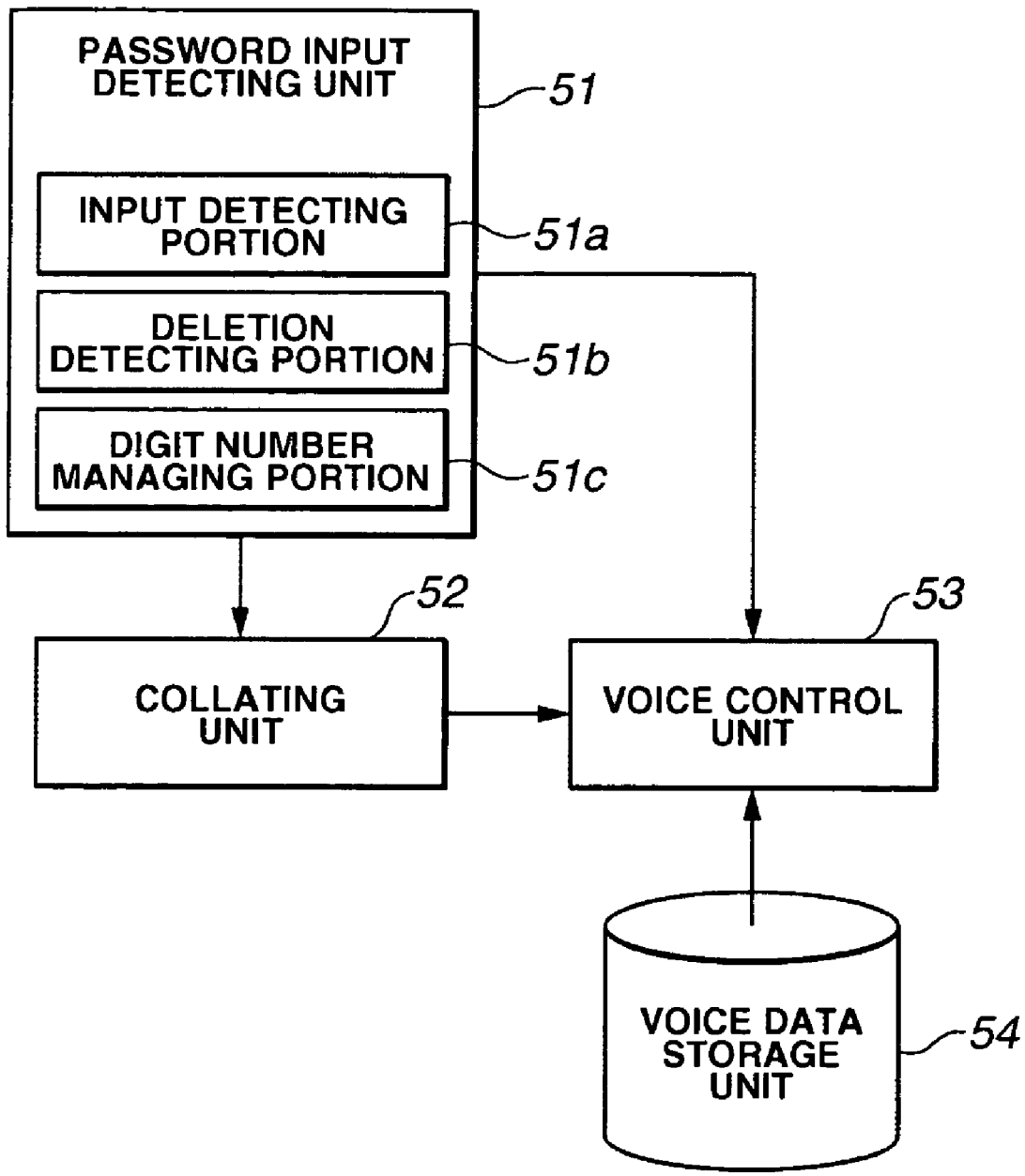
FIG. 6 is a block diagram illustrating portions of the functional configuration of the terminal 40 for exclusive use by visually impaired persons in accordance with the first embodiment of the present invention.

FIG. 6 is a block diagram illustrating portions of the functional configuration of the terminal 40 for exclusive use by visually impaired persons. It should be noted that a description will be given here by citing only the constituent elements in accordance with the present invention.

The terminal 40 for exclusive use by visually impaired persons is configured by including a password input detecting unit 51, a collating unit 52, a voice control unit 53, and a voice data storage unit 54.

The password input detecting unit 51 is processing unit for detecting a password input operation from the operation unit 46 provided in the terminal 40 for exclusive use by visually impaired persons. The password input detecting unit 51 has in it an input detecting portion 51a for detecting that a password has been entered; a deletion detecting portion 51b for detecting an already entered password has been deleted; and a digit number managing portion 51c for managing the number of digits of the password on the basis of the results of detection by the input detecting portion 51a and the deletion detecting portion 51b. The term "password input detecting unit" in the claims includes this password input detecting unit 51.

The collating unit 52 is a processing unit for collating the password entered from the operation unit 46 with an already registered password. Here, in a case where it is determined that the collation is proper, voice data to the effect that the entered password is proper is synthesized by the voice control unit 53 described below.

The voice control unit 53 is a processing unit for effecting the synthesis of voice data. For example, voice data corresponding to the number of digits of the entered password is synthesized in response to the input operation of the password. The voice data synthesized by the voice control unit 53 is voice guided by the voice guide output unit 42 explained with reference to FIG. 3 mentioned above. The "voice guide outputting unit" in the claim includes the voice control unit 53 and the voice guide output unit 42.

The voice data storage unit 54 is a storage device for storing various voice data. The voice control unit 53 acquires corresponding data from the various voice data stored in it and synthesizes voice data.

This voice data storage unit 54 corresponds to the storage unit 45 referred to in the system configuration of the terminal for exclusive use by visually impaired persons explained with reference to FIG. 3 mentioned above. The remaining password input detecting unit 51, collating unit 52, and voice control unit 53 are realized on the control unit 43. Described above is the explanation of the function block diagram illustrating portions of the functional configuration of the terminal 40 for exclusive use by visually impaired persons in accordance with the present invention.

Figure 7:
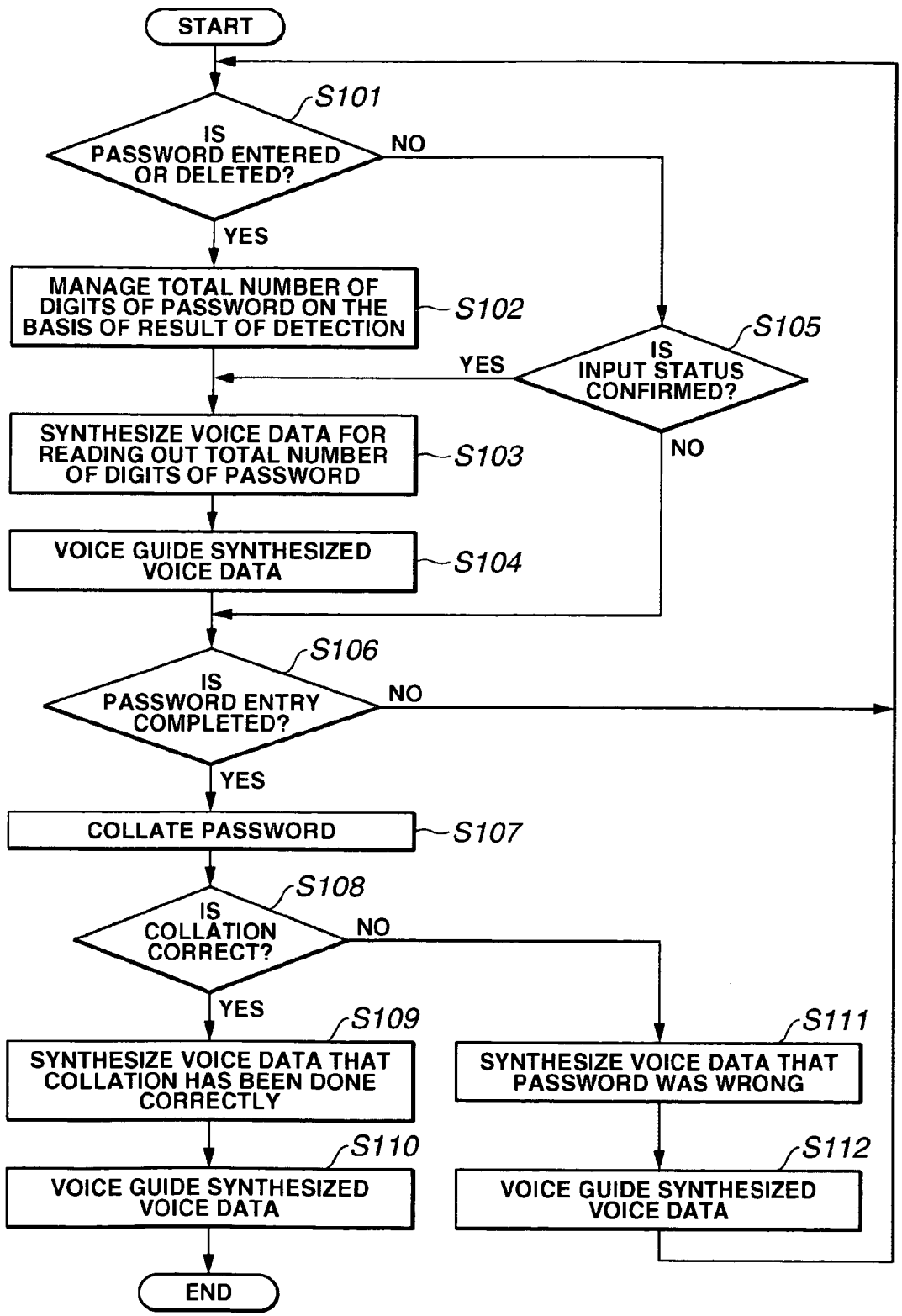
FIG. 7 is a flowchart explaining the operation of the voice guide system in accordance with the first embodiment of the present invention.

Next, referring to FIG. 7, a description will be given of the operation of the voice guide system in accordance with the present invention. It should be noted that a description will be given here under the assumption that the entry of a password is being requested by the terminal 40 for exclusive use by visually impaired persons.

The terminal 40 for exclusive use by visually impaired persons remains on standby until some input operation is made by a user such as a visually impaired person. Specifically, the terminal 40 for exclusive use by visually impaired persons waits until an input operation by the user is made, such as the entry or deletion of the password, the confirmation of the input status of a password on pressing a password confirmation button or the like, or the instruction of the completion of password entry on pressing an enter button or the like (NO in Step S101, then NO in Step S105, and then NO in Step S106).

Here, if the user performs password input operation from the operation unit 46 (YES in Step S110), this processing is started.

When this processing is started, the user's input operation is detected by the password input detecting unit 51. Namely, if the password is entered, the input is detected by the input detecting portion 51a. Meanwhile, if an already entered password is deleted, the deletion is detected by the deletion detecting portion 51b. The input/deletion of the password detected by the input detecting portion 51a or the deletion detecting portion 51b is notified to the digit number managing portion 51c. The digit number managing portion 51c, upon receiving this notification, manages the number of the total number of digits of the password which increases or decreases in correspondence with the entry and deletion of the password (Step S102).

In response to the change in the number of digits of the password managed by the digit number managing portion 51c, the voice control unit 53 synthesizes the voice data stored in the voice data storage unit 54 to inform the user of the total number of digits of the password (Step S103), and outputs by voice the synthesized voice data from the voice guide output unit 42 (Step S104). For example, if the total number of digits of the entered password is two, a voice guide message is outputted that "Two digits have been entered." Thus, each time one character of the password is entered or deleted, the total number of digits of the entered password is voice guided by the terminal 40 for exclusive use by visually impaired persons, so that it becomes possible for a user such as the visually impaired person, who cannot visually confirm the input status of the password, to grasp the input status of the password.

In addition, if the password confirmation button has been pressed by the user to confirm the input status of the password while the terminal 40 for exclusive use by visually impaired persons is on standby (YES in Step S105), the voice control unit 53 synthesizes the voice data stored in the voice data storage unit 54 on the basis of the number of digits of the password managed by the password input detecting unit 51, in order to inform the user of the total number of digits of the password (Step S103). The synthesized voice data is outputted by voice from the voice guide output unit 42 (Step S104).

The processing is thus effected repeatedly from Step S101 to Step S105, and upon completion of the entry of the password, the user presses the enter button to instruct the completion of the entry of the password (YES in Step S106).

Upon instruction of the completion of the entry of the password, the collation of the password is effected by the collating unit 52 to determine whether or not the entered password is accurate (Step S107).

If it is determined as a result of the password collation by the collating unit 52 that the entered password is wrong (NO in step S108), the voice control unit 53 synthesizes the voice data stored in the voice data storage unit 54 to voice guide to the effect that the entered password is wrong (Step S111), and outputs by voice the synthesized voice data from the voice guide output unit 42 (Step S112). Subsequently, the operation returns to Step S101 again, and the terminal 40 for exclusive use by visually impaired persons remains on standby until some input operation is made by the user.

On the other hand, if it is determined as a result of the password collation by the collating unit 52 that the entered password is correct (YES in step S108), the voice control unit 53 synthesizes the voice data stored in the voice data storage unit 54 to voice guide the user to the effect that the collation of the password has been properly done (Step S109). The synthesized voice data is outputted by voice from the voice guide output unit 42 (Step S110), and this processing ends.

As described above, in the present invention, since the arrangement provided is such that the total number of digits of the password is voice guided in response to the entry of the password or the deletion of the already entered password, it becomes possible also for a user such as a visually impaired person, who cannot visually confirm the input status of the password, to grasp the input status of the password.

For this reason, since it becomes possible to easily perform the input operation of the password while the confidentiality required by the password is maintained, the operability and convenience for users such as visually impaired persons, in particular, improve.

SECOND EMBODIMENT

Although in the above-described first embodiment a description has been given of the case where a user such as a visually impaired person is allowed to grasp the input status of the password by voice guiding the total number of digits of the already entered password, in a second embodiment a description will be given of an embodiment for obtaining effects similar to those of the above-described first embodiment by providing an (encrypted) voice guide by relating voice data different from characters to the entered characters (0 to 9, A to Z).

It should be noted that since the overall configuration of the second embodiment is substantially identical to the one described with reference to FIG. 1 concerning the above-described first embodiment, a description thereof will be omitted, and a description will be given here of the functional configuration and operation.

Figure 8:
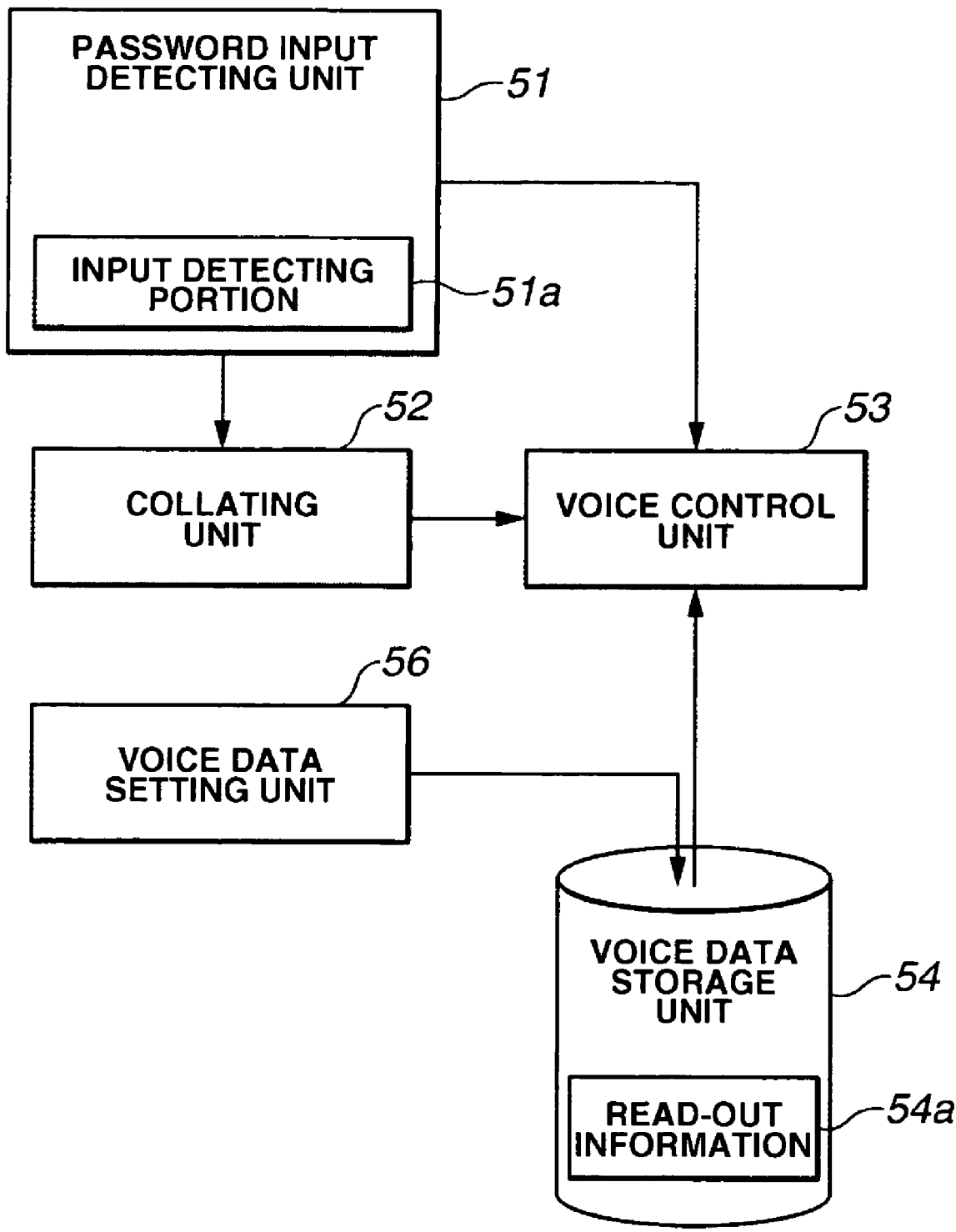
FIG. 8 is a block diagram illustrating portions of the functional configuration of the terminal 40 for exclusive use by visually impaired persons in accordance with a second embodiment of the present invention.

FIG. 8 is a block diagram illustrating portions of the functional configuration of the terminal 40 for exclusive use by visually impaired persons. It should be noted that a description will be given here by citing only the constituent elements in accordance with the present invention. It should be noted that since the units and portion which are denoted by the same reference numerals as those in FIG. 6 explaining the first embodiment operate substantially identically, a description will be given here of only the differences.

The terminal 40 for exclusive use by visually impaired persons is configured by including the password input detecting unit 51, the collating unit 52, the voice control unit 53, the voice data storage unit 54, and a voice data setting unit 55.

The voice data setting unit 55 is a processing unit for setting voice data (desired by a user) different from characters (password) such as numbers and alphabet by relating the voice data to such characters. The voice data set here is stored in the voice data storage unit 54 as read-out information 54a.

For example, in a case where the password is "52c3," and in a case where "se" is set in the voice data setting unit 55 by being related to "5," "i" to "2," "jo" to "c," and "u" to "3," then if "52c3" is entered, "seijou (meaning proper in Japanese)" is voice guided. Further, since each time one character is entered, the voice data related to the password character is synthesized and voice guided, it becomes possible also for a user such as a visually impaired person, who cannot visually confirm the input status of the password, to grasp the input status of the password.

The voice data setting unit 55, the password input detecting unit 51, the collating unit 52, and the voice control unit 53 are realized on the control unit 43, and the voice data storage unit 54 corresponds to the storage unit 45. Described above is the explanation of the function block diagram illustrating portions of the functional configuration of the terminal 40 for exclusive use by visually impaired persons in accordance with the present invention.

Figure 9:
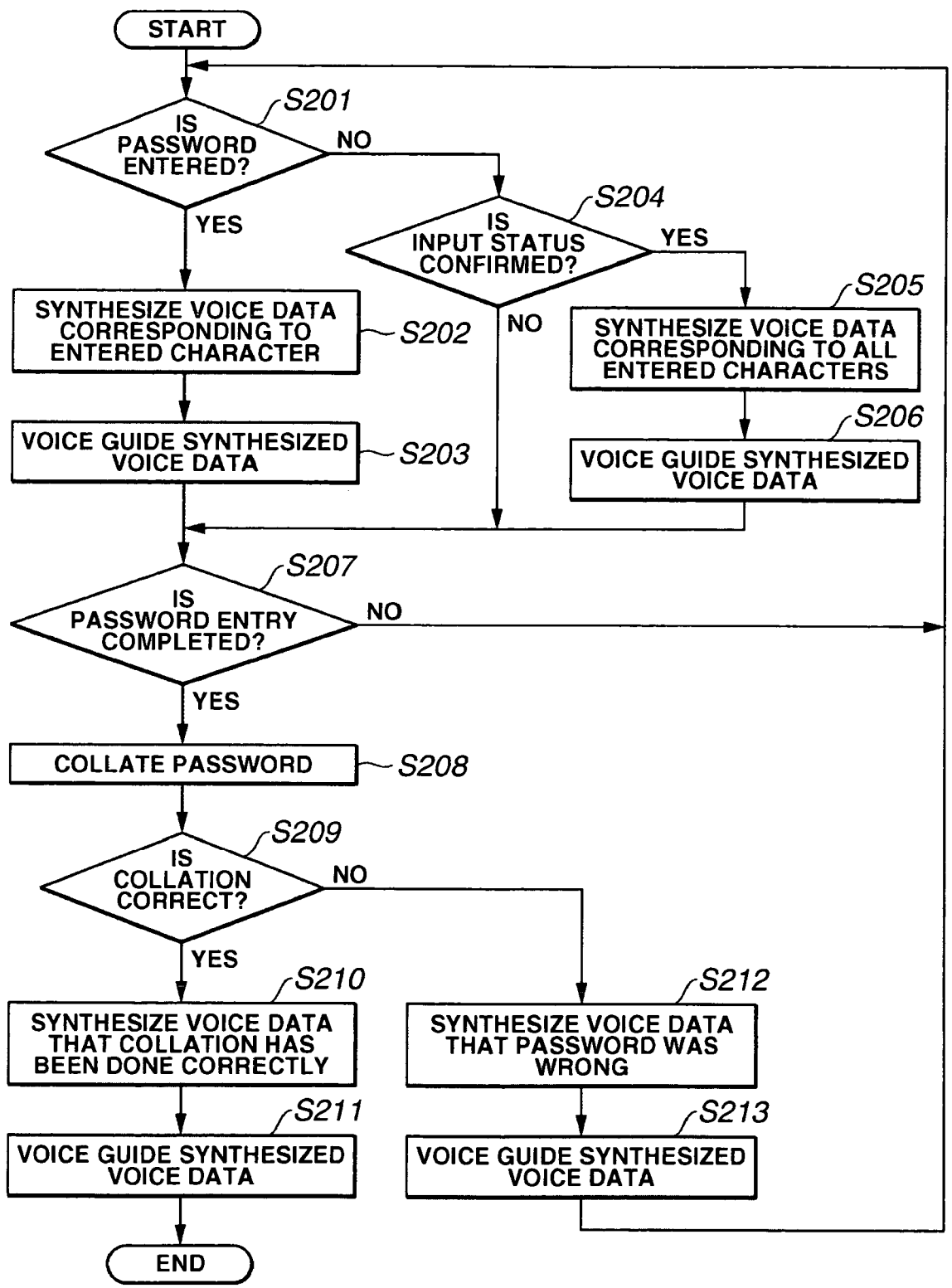
FIG. 9 is a flowchart explaining the operation of the voice guide system in accordance with the second embodiment of the present invention.

Next, referring to FIG. 9, a description will be given of the operation of the voice guide system in accordance with the second embodiment. It should be noted that a description will be given here under the assumption that the entry of a password is being requested by the terminal 40 for exclusive use by visually impaired persons.

The terminal 40 for exclusive use by visually impaired persons remains on standby until some input operation is made by a user such as a visually impaired person. Specifically, the terminal 40 for exclusive use by visually impaired persons waits until an input operation by the user is made, such as the entry of the password, the confirmation of the input status of a password on pressing a password confirmation button or the like, or the instruction of the completion of password entry on pressing an enter button or the like (NO in Step S201, then NO in Step S204, and then NO in Step S207).

Here, if the user performs password input operation from the operation unit 46 (YES in Step S201), this processing is started.

When this processing is started, the user's input operation is detected by the password input detecting unit 51. Namely, if the password is entered, the input is detected by the input detecting portion 51a.

When the entry of the password by the user is detected by the input detecting portion 51a, the voice control unit 53 synthesized voice data corresponding to the inputted character on the basis of the read-out information 54a stored in the voice data storage unit 54 (Step S202), and outputs by voice the synthesized voice data from the voice guide output unit 42 (Step S203). For example, in a case where "se" has been set in the read-out information 54a by being related to "5," then if "5" is entered, "se" is voice guided.

In addition, if the password confirmation button has been pressed by the user to confirm the input status of the password while the terminal 40 for exclusive use by visually impaired persons is on standby (YES in Step S204), the voice control unit 53 synthesizes the voice data corresponding to all the inputted characters (password) on the basis of the read-out information 54a stored in the voice data storage unit 54 (Step S205), and outputs the synthesized voice data by voice from the voice guide output unit 42 (Step S206).

The processing is thus effected repeatedly from Step S201 to Step S206, and upon completion of the entry of the password, the user presses the enter button to instruct the completion of the entry of the password (YES in Step S207).

Upon instruction of the completion of the entry of the password, the collation of the password is effected by the collating unit 52 to determine whether or not the entered password is accurate (Step S208).

If it is determined as a result of the password collation by the collating unit 52 that the entered password is wrong (NO in step S208), the voice control unit 53 synthesizes the voice data stored in the voice data storage unit 54 to voice guide to the effect that the entered password is wrong (Step S212), and outputs by voice the synthesized voice data from the voice guide output unit 42 (Step S213). Subsequently, the operation returns to Step S201 again, and the terminal 40 for exclusive use by visually impaired persons remains on standby until some input operation is made by the user.

On the other hand, if it is determined as a result of the password collation by the collating unit 52 that the entered password is correct (YES in step S209), the voice control unit 53 synthesizes the voice data stored in the voice data storage unit 54 to voice guide the user to the effect that the collation of the password has been properly done (Step S210). The synthesized voice data is outputted by voice from the voice guide output unit 42 (Step S211), and this processing ends.

As described above, in the second embodiment, the arrangement provided is such that in the case where voice data different from characters (password) such as numbers and alphabet has been set by relating the voice data to such characters, and the password has been entered, the set different voice data is voice guided. Therefore, it becomes possible only for the user entering the password to grasp the input status of the password, so that the confidentiality required by the password is maintained, and effects similar to those of the above-described first embodiment are obtained.

It should be noted that although in the foregoing embodiments a description has been given of the case in which the voice guide system in accordance with the present invention is applied to the combination machine 1 and the terminal 40 for exclusive use by visually impaired persons, the present invention is not limited to the same, and the voice guide system in accordance with the present invention may be applied to an information processing apparatus such as a facsimile machine, a copying machine and a combination machine, and a personal computer.

Figure 10:
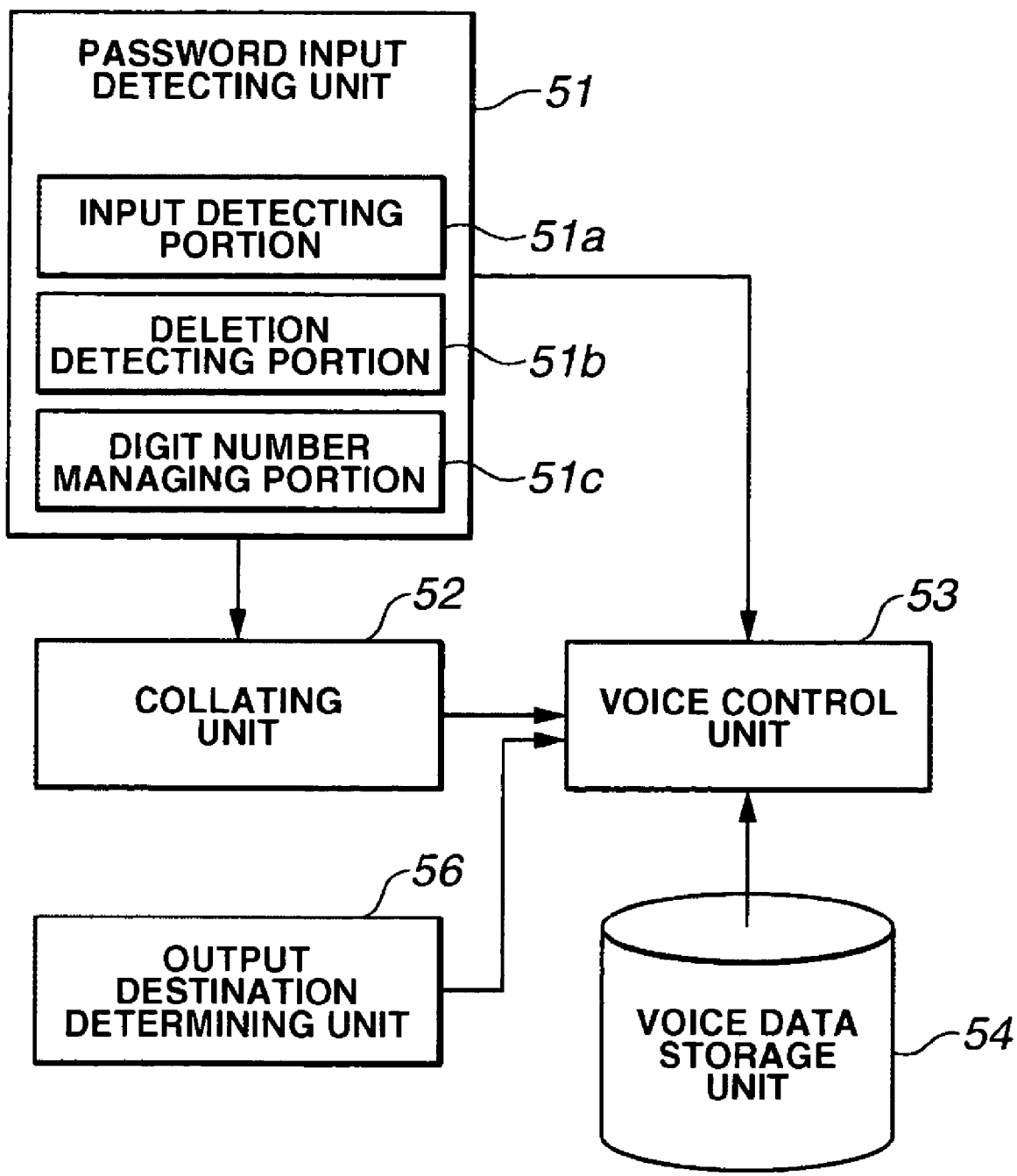
FIG. 10 is a block diagram illustrating portions of the functional configuration of the terminal 40 for exclusive use by visually impaired persons in accordance with a modification the present invention.

In addition, the present invention is not limited to the embodiments shown above and in the drawings, and may be implemented by being modified, as required, within the range that does not change its gist. Some other modifications of the voice guide system described in the foregoing embodiments will be cited below.

a) As shown in FIG. 10, an output destination determining unit 56 may be provided in the configuration of the terminal 40 for exclusive use by visually impaired persons described with reference to FIG. 6, and a determination may be made by this output destination determining unit 56 as to whether or not the output destination of the voice guide has been directed to a specific user. If it can be confirmed that the output destination is directed to a specific user, the password may be read out as it is.

Figure 11:
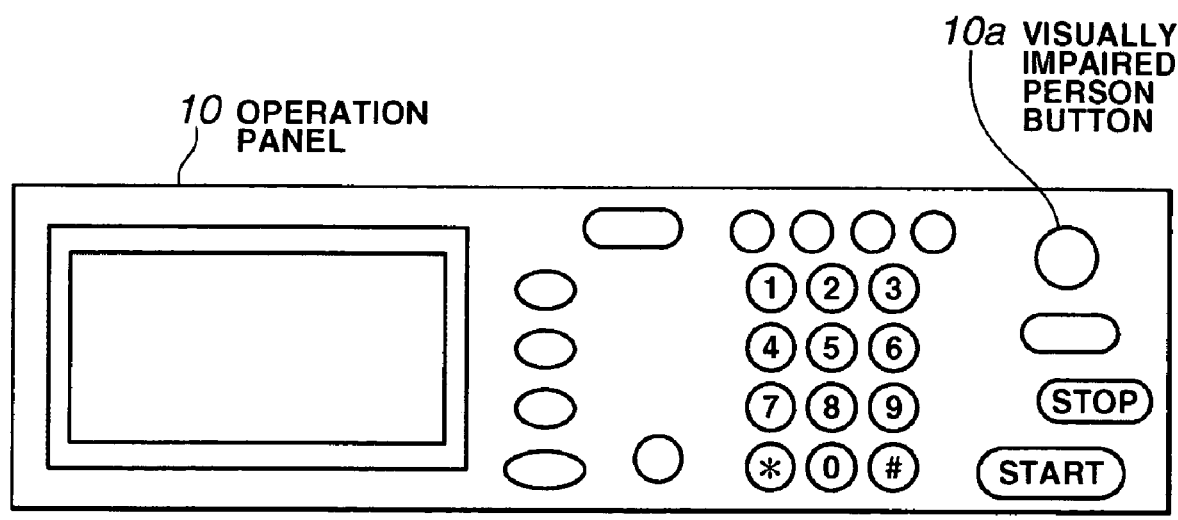
FIG. 11 is a diagram illustrating an example of the layout of the terminal 40 for exclusive use by visually impaired persons in accordance with another modification the present invention.
Figure 12:
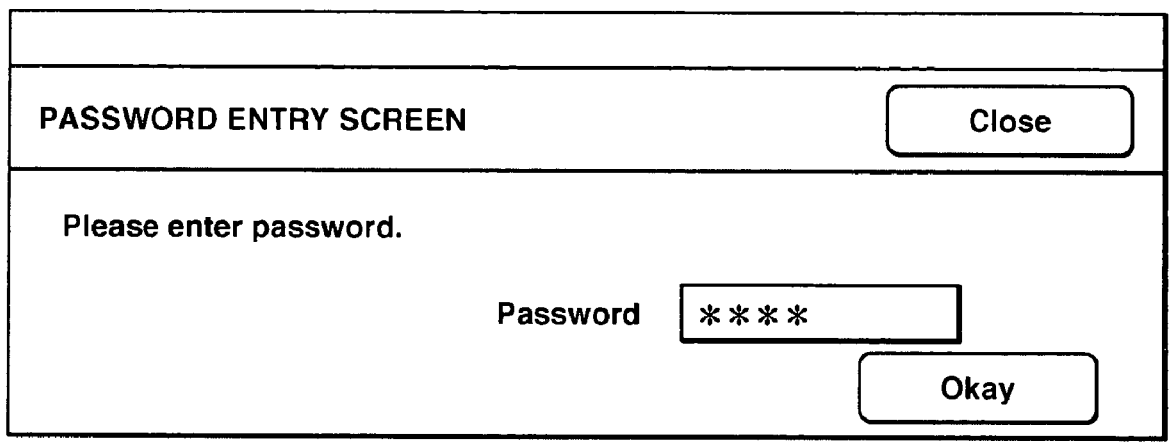
FIG. 12 is a diagram for explaining a problem of a conventional technique.

Namely, a determination is made by the output destination determining unit 56 as to whether the voice guide output unit 42 described with reference to FIG. 3 is a speaker for providing a voice guide to a person in the surroundings or a headphone for providing a voice guide to a specific user. As a result of the determination, in the case where a voice guide is outputted to the headphone, the entered password is read as it is from the voice guide output unit 42. In this case, even if the password is read out as it is, the confidentiality of the password is maintained, and it becomes possible also for a visually impaired person to perform the password entry while confirming the contents of the entry, so that the operability and convenience improve.

b) As shown in FIG. 11, a visually impaired person button 10a may be provided on the input device (operation buttons) on the operation panel 10, so as to allow a visually impaired person to enter a password from the combination machine 1 by pressing such a button. In this case, upon pressing the visually impaired person button 10a, a voice guide such as the one described in the foregoing embodiments is given from a speaker disposed in the combination machine 1.

The voice guide system and the voice guide method thereof in accordance with the present invention are applicable to various information processing apparatuses in general, and can be effectively utilized particularly in creating a work-friendly office environment for visually impaired persons (persons with weak eyesight, persons with low vision, totally blind persons, etc.).

As described above, a first aspect of the present invention provides a voice guide system for outputting voice in response to operations of an information processing apparatus, including: a password input detecting unit that detects an input operation of a password; and a voice guide outputting unit that outputs by voice an input status of the password in correspondence with the detection of the input operation of the password by the password input detecting unit.

A second aspect of the present invention provides the voice guide system according to the first aspect of the invention, in which the voice guide outputting unit outputs by voice a current total number of digits in correspondence with the detection of the input operation of each digit of the password by the password input detecting unit.

A third aspect of the present invention provides the voice guide system according to the first aspect of the invention, further including a setting unit that sets voice data different from a character including a number and alphabet by relating the voice data to the character, in which the voice guide outputting unit outputs voice on the basis of the different voice data set in the setting unit, in correspondence with the detection of the input operation of a character of the password by the password input detecting unit.

A fourth aspect of the present invention provides the voice guide system according to any one of the first to third aspects of the invention, further including an output destination determining unit that determines whether or not the voice output by the voice guide outputting unit is an output directed to a specific user, in which if it is determined by the output destination determining unit that the voice output by the voice guide outputting unit is the output directed to the specific user, the voice guide outputting unit outputs by voice the password as it is, in correspondence with the detection of the input operation of the password by the password input detecting unit.

A fifth aspect of the present invention provides the voice guide system according to the first aspect of the invention, in which the voice guide outputting unit outputs by voice the input status of the password in correspondence with the operation of confirming an inputted content of the password.

A sixth aspect of the present invention provides a voice guide method for outputting voice in response to operations of an information processing apparatus, the method including: detecting an input operation of a password; and outputting by voice an input status of the password in correspondence with the detection of the input operation of the password.

A seventh aspect of the present invention provides the voice guide method according to the sixth aspect of the invention, wherein the outputting step is performed by outputting by voice a current total number of digits in correspondence with the detection of the input operation of each digit of the password.

An eighth aspect of the present invention provides the voice guide method according to the sixth aspect of the invention, further including: setting voice data different from a character including a number and alphabet by relating the voice data to the character, wherein the outputting step is performed by outputting by voice on the basis of the set different voice data, in correspondence with the detection of the input operation of a character of the password.

A ninth aspect of the present invention provides the voice guide method according to any one of the sixth to eighth aspects of the invention, further including: determining whether or not the output voice is an output directed to a specific user, wherein, if it is determined that the output voice is the output directed to the specific user, the outputting step is performed by outputting by voice the password as it is, in correspondence with the detection of the input operation of the password.

A tenth aspect of the present invention provides the voice guide method according to sixth aspect of the invention, wherein the outputting step is performed by outputting by voice the input status of the password in correspondence with the operation of confirming an inputted content of the password.

According to the above-mentioned aspects of the present invention, the arrangement provided is such that an input operation of the password (entry or deletion of the password) is detected, and the input status of the password (the total number of digits of the password and the related different voice) is outputted by voice. Therefore, it becomes possible also for a user such as a visually impaired person, who cannot visually confirm the input status of the password, to grasp the input status of the password.

For this reason, since it becomes possible to easily perform the input operation of the password while the confidentiality required by the password is maintained, the operability and convenience for users such as visually impaired persons, in particular, improve.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-84171 filed on Mar. 23, 2005 including specification, claims, drawings and abstract is incorporated herein by reference in its entirety.

What is claimed is:

1. A voice guide system for outputting voice in response to operations of an information processing apparatus, comprising:
    a password input detecting unit that detects an input operation of a password; and
    a voice guide outputting unit that outputs by voice an input status of the password in correspondence with the detection of the input operation of the password by the password input detecting unit,
    wherein the voice guide outputting unit outputs by voice a current total number of digits in correspondence with the detection of the input operation of each digit of the password by the password input detecting unit.

2. The voice guide system of claim 1, wherein the outputted current total number of digits is for informing visually-impaired individuals of a progress of the input operations.

3. The voice guide system of claim 1, wherein the voice guide outputting unit outputs the current total number of digits as a spoken number.

4. The voice guide system according to claim 1, further comprising:
    an output destination determining unit that determines whether the voice output by the voice guide outputting unit is an output directed to a specific user,
    wherein if it is determined by the output destination determining unit that the voice output by the voice guide outputting unit is the output directed to the specific user, the voice guide outputting unit outputs by voice the password, in correspondence with the detection of the input operation of the password by the password input detecting unit.

5. The voice guide system according to claim 1, further comprising:
    an output destination determining unit that determines whether the voice output by the voice guide outputting unit is an output directed to a specific user,
    wherein if it is determined by the output destination determining unit that the voice output by the voice guide outputting unit is the output directed to the specific user, the voice guide outputting unit outputs by voice the password, in correspondence with the detection of the input operation of the password by the password input detecting unit.

6. The voice guide system of claim 1, wherein the current total number of digits is an indicator of the input status.

7. The voice guide system according to claim 1, wherein the voice guide outputting unit outputs by voice the input status of the password in correspondence with the operation of confirming an inputted content of the password.

8. The voice guide system of claim 1, further comprising a password confirmation button that causes the voice guide system to output by voice the input status of the password.

9. The voice guide system of claim 1, wherein the voice guide outputting unit outputs the input status by voice in correspondence with the detection of the input operation of the password each time a character of the password is entered.

10. A voice guide method for outputting voice in response to instructions stored in an information processing apparatus including a computer-readable storage medium and a voice guide outputting unit, the instructions comprising:
    detecting an input operation of a password by the information processing apparatus;
    outputting by voice using the voice guide outputting unit an input status of the password in correspondence with the detection of the input operation of the password; and
    encrypting voice data to include alphabet characters, numbers and syllables that correspond to each character in the password,
    wherein the outputting step is performed by outputting by voice using the voice guide outputting unit on the basis of the set encrypted voice data, in correspondence with the detection of the input operation of a character of the password.

11. The voice guide method according to claim 10, further comprising:
    determining whether the output voice is an output directed to a specific user,
    wherein, if it is determined that the output voice is the output directed to the specific user, the outputting step is performed by outputting by voice the password as it is, in correspondence with the detection of the input operation of the password.

12. The voice guide method according to claim 10, further comprising
outputting by voice, when a password confirmation button is pressed, the input status of the password.

13. The voice guide method according to claim 10, further comprising
outputting the input status by voice each time a character of the password is entered.

14. The voice guide method according to claim 10, further comprising reading the entered password from the voice guide output unit when the specific user is wearing headphones.

15. A voice guide method for outputting voice in response to instructions stored in an information processing apparatus including a computer-readable storage medium and a voice guide outputting unit, the instructions comprising:
detecting an input operation of a password; and
outputting by voice using the voice guide outputting unit an input status of the password in correspondence with the detection of the input operation of the password,
wherein the outputting step is performed by outputting by voice using the voice guide outputting unit a current total number of digits in correspondence with the detection of the input operation of each digit of the password.

16. The voice guide method according to claim 15, further comprising:
determining whether the output voice is an output directed to a specific user,
wherein, if it is determined that the output voice is the output directed to the specific user, the outputting step is performed by outputting by voice the password as it is, in correspondence with the detection of the input operation of the password.

17. The voice guide method according to claim 15, further comprising
outputting by voice, when a password confirmation button is pressed, the input status of the password.

18. The voice guide method according to claim 15, further comprising:
determining whether the output voice is an output directed to a specific user,
wherein, if it is determined that the output voice is the output directed to the specific user, the outputting step is performed by outputting by voice the password as it is, in correspondence with the detection of the input operation of the password.

19. The voice guide method according to claim 15, further comprising
outputting the input status by voice each time a character of the password is entered.

20. The voice guide method according to claim 15, wherein the outputting step is performed by outputting by voice the input status of the password in correspondence with the operation of confirming an inputted content of the password.

21. The voice guide method according to claim 15, wherein the current total number of digits is an indicator of the input status.

22. The voice guide method according to claim 15, wherein the outputting step outputs the current total number of digits as a spoken number.

23. The voice guide method according to claim 15, wherein the outputting step outputs the current total number of digits for informing visually-impaired individuals of a progress of the input operations.

24. A voice guide system for outputting voice in response to operations of an information processing apparatus, comprising:
a password input detecting unit that detects an input operation of a password;
a voice guide outputting unit that outputs by voice an input status of the password in correspondence with the detection of the input operation of the password by the password input detecting unit;
an encrypting unit that encrypts voice data to include alphabet characters, numbers and syllables that correspond to each character in the password,
wherein the voice guide outputting unit outputs voice on the basis of the encrypted voice data set in the setting unit, in correspondence with the detection of the input operation of a character of the password by the password input detecting unit.

25. The voice guide system according to claim 24, further comprising:
an output destination determining unit that determines whether the voice output by the voice guide outputting unit is an output directed to a specific user,
wherein if it is determined by the output destination determining unit that the voice output by the voice guide outputting unit is the output directed to the specific user, the voice guide outputting unit outputs by voice the password as it is, in correspondence with the detection of the input operation of the password by the password input detecting unit.

26. The voice guide system of claim 24, further comprising
a password confirmation button that causes the voice guide system to output by voice the input status of the password.

27. The voice guide system of claim 24, wherein
the voice guide outputting unit outputs the input status by voice in correspondence with the detection of the input operation of the password each time a character of the password is entered.

28. The voice guide system of claim 24, wherein, when the specific user is wearing headphones, the entered password is read from the voice guide output unit.

* * * * *